United States Patent [19]

Fejes et al.

[11] Patent Number: 4,636,292
[45] Date of Patent: Jan. 13, 1987

[54] ELECTRODE FOR ELECTROCHEMICAL MEASUREMENTS IN AQUEOUS SOLUTIONS OF HIGH TEMPERATURES

[75] Inventors: Peter Fejes; Eva Hallden, both of Västerås, Sweden

[73] Assignee: AB Asea-Atom, Västeras, Sweden

[21] Appl. No.: 729,426

[22] Filed: May 1, 1985

[30] Foreign Application Priority Data

May 3, 1984 [SE] Sweden ............................. 8402387

[51] Int. Cl.4 ............................................. G01N 27/46
[52] U.S. Cl. ................................... 204/404; 204/400; 204/435; 324/439; 324/449; 324/450; 376/245
[58] Field of Search ............... 204/1 T, 1 C, 435, 404, 204/421–429, 400; 324/450, 449, 439; 376/245

[56] References Cited

U.S. PATENT DOCUMENTS

| 2,183,531 | 12/1939 | Allison | 204/435 |
|---|---|---|---|
| 2,190,835 | 2/1940 | Gruss et al. | 204/435 |
| 2,311,977 | 2/1943 | Coleman | 204/435 |
| 2,832,039 | 4/1958 | Hardesty | 324/450 |
| 3,359,188 | 12/1967 | Fischer | 204/422 |
| 3,399,667 | 9/1968 | Nishimoto et al. | 204/435 |
| 3,513,384 | 5/1970 | Schneider | 324/450 |
| 3,578,578 | 5/1971 | Von Krusenstierna | 204/422 |
| 3,784,459 | 1/1974 | Jackson | 204/423 |
| 3,846,795 | 11/1974 | Jones | 376/245 |
| 4,116,798 | 9/1978 | Magar et al. | 204/404 |
| 4,147,596 | 4/1979 | Baboian et al. | 204/404 |
| 4,198,279 | 4/1980 | Brown et al. | 204/428 |
| 4,339,320 | 7/1982 | Friese et al. | 204/428 |

Primary Examiner—T. Tung
Attorney, Agent, or Firm—Watson, Cole, Grindle & Watson

[57] ABSTRACT

An electrode (20) for electrochemical measurements in aqueous solutions at high temperatures, especially measurements in water in or from a primary or secondary circuit of a nuclear reactor in operation at a temperature of the water substantially prevailing at that time, comprises a conductor (21) of a platinum-group metal which for part of its extension is enclosed within a casing (22) making tight contact with the conductor and consisting of sintered-together particles of aluminum oxide, zirconium oxide or other electrically-insulating material which is inert to water. The conductor has one part (21a) exposed the aqueous solution and one connection part (21b) for connection to an electrical measuring member.

10 Claims, 5 Drawing Figures

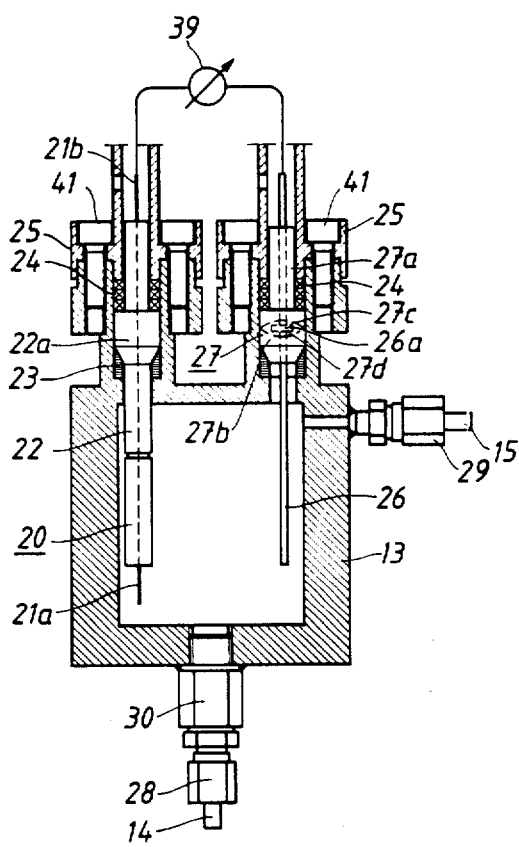
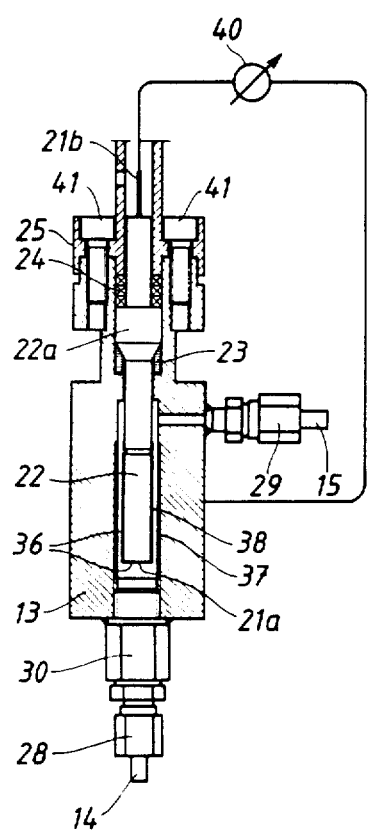

ELECTRODE FOR ELECTROCHEMICAL MEASUREMENTS IN AQUEOUS SOLUTIONS OF HIGH TEMPERATURES

BACKGROUND OF THE INVENTION

1. Field of the Invention

The present invention relates to an electrode for electrochemical measurements in aqueous solutions, especially electrochemical measurements in water in or from the primary circuit of a nuclear reactor during operation at the temperature of the water prevailing at that time.

2. The Prior Art

In operation of nuclear reactors, corrosion of construction material in the primary circuit occurs, that is, in the circuit of a boiling water reactor where steam generated in the reactor vessel is led to a steam turbine, from there to a condenser and condensate formed in the condenser, after preheating, is returned to the reactor vessel, and in the circuit of a pressurized water reactor where water heated in the reactor vessel is led to a steam generator and from there is returned to the reactor vessel, as well as in the secondary circuit of a pressurized water reactor, that is, in the circuit where steam generated in the steam generator is led to a steam turbine, from there to a condenser and condensate formed in the condenser, after preheating, is returned to the steam generator. Of particular importance are such cases of corrosion which result in stress corrosion, which may occur, among other things, in pipe sockets with welding stresses and such as lead to oxide growth on fuel tubes and fuel channels. A corrosion progress in the primary circuit of a reactor can be monitored during operation by continuously measuring the electrochemical potential of construction material included in the primary circuit, for example in stainless steel. It can then be determined whether such changes in the corrosion environment have occurred as require that measures regarding the operation of the reactor should be taken in order to eliminate the causes of the changes. For example, the content of oxygen or the content of other corrosive substances may have become impermissibly high, resulting in increased corrosion and oxide growth. The corrosion environment in the primary and secondary circuits of a reactor during operation can also be monitored by continuously measuring the electrical conductivity of the water in the circuit. By following the conductivity, it is also possible to establish whether such changes of the reactor water have occurred as require corrections of the operation of the reactor, such as, e.g., replacement of ion exchange filters.

It is of the utmost importance that the measurements mentioned above are carried out under the conditions prevailing in the reactor in operation, since solubilities and equilibriums at other temperatures are different and therefore not representative. The measurements of the electrochemical potential of selected construction materials require a reference electrode. It is of decisive importance for the measurement results that the reference electrode is stable and reliable at the high temperatures prevailing in the reactor water. Up to now there has been used as reference electrode above all a silver-silver chloride electrode with an electrode chamber containing water with dissolved silver chloride or dissolved potassium chloride. The electrode chamber is provided with a liquid bridge which delimits the electrolytic chamber from the water into which the electrode is immersed. In the known reference electrode the silver conductor is surrounded by an electrically insulating casing consisting of polytetrafluoro ethylene. The casing may, for example, consist of a tube of polytetrafluoro ethylene which is shrunk onto the silver conductor. Also seals for walls in the autoclave or corresponding equipment, in which the electrode is inserted during measurement, as well as the electrolytic chamber, are made of polytetrafluoro ethylene. In the same way as electrodes of construction materials whose electrochemical potential is to be supervised, the reference electrode is arranged in a circuit outside the reactor vessel, through which reactor water is led which is thereafter passed to an outlet. One drawback with the polytetrafluoro ethylene is that its use involves severe sealing problems during temperature cyclings due to its limited dimensional stability and strength at the temperatures which prevail in the water in the primary and secondary circuits of reactors. The sealing problems result in the reference electrode becoming complicated in construction without it being possible to eliminate the risk of leaks arising and, thus, the risk of radioactive water leaking out. Electrodes which are used during conductivity measurements may, in an analogous manner, be provided with insulating casings of polytetrafluoro ethylene. These casings, of course, have the same weaknesses as those described for the reference electrode of silver/silver chloride.

SUMMARY OF THE INVENTION

According to the present invention, it has been found to be possible to achieve electrodes with insulating casings which have a considerably greater resistance to high temperatures and a longer life than polytetrafluoro ethylene, which form a completely tight joint with the conductor surrounded by the casing, so as to eliminate any risk of leakage along the joint, and which are at least approximately completely inert to the water in the primary and secondary circuits of nuclear reactors. The latter property is of great importance, on the one hand, because the electrode thereby maintains its properties unchanged when being used during measurements of electrochemical potentials and, on the other hand, because it does not give off any conductive constituents which may influence the measurement results during conductivity measurements. Also, when giving off very small quantities of conductive constituents, the measurement results would be greatly influenced during measurements in such clean water as is used in the primary and secondary circuits, where the concentration of impurities is in the order of magnitude of ppb, that is, in the order of $10^{-9}$ parts by weight per part by weight water. The electrode according to the invention can be arranged without difficulty to form a dimensionally stable, reliable, tight joint with a surrounding vessel wall in which it is inserted so that there is no risk of leakage.

The present invention relates to an electrode for electrochemical measurements in aqueous solutions at high temperatures, especially electrochemical measurements in water in or from the primary or secondary circuit of a nuclear reactor during operation at the temperature substantially prevailing in the water at that time, the electrode comprising a conductor of a platinum-group metal, which for part of its extension is enclosed in a casing making tight contact with the wire and consisting of sintered particles of aluminium oxide, zirconium dioxide or stabilized zirconium dioxide, the conductor having one part exposed in the casing for arrangement in the aqueous solution and one connection part for connection to an electrical measuring means. The stabilized zirconium dioxide may consist of zirconium dioxide partially or fully stabilized with an oxide, such as an oxide or a rare earth metal, especially yttrium oxide, further magnesium oxide or calcium oxide. In partially stablilized zirconium dioxide, the stabilizing oxide preferably constitutes 1-4 percent by mole, and in fully stabilized zirconium dioxide the stabilizing oxide preferably constitutes 7-20 percent by mole. Stabilization takes place by mixing powders of the zirconium dioxide and of the stablilizing oxide as well as heat treatment of the mixture at a temperature of 1000°-2000° C. depending on the content of the respective substances. The stablilization results in the phase transformation temperature of the zirconium dioxide being reduced to room temperature. For fully stabilized zirconium dioxide a cubic lattice is maintained, and for partially stabilized zirconium dioxide a tetragonal lattice is maintained.

By platinum-group metal are meant in this application both a metal belonging to the platinum group and alloys of two or more such metals, for example platinum-rhodium. Platinum is especially preferred.

The casing thus consists of an electrically insulating material. As insulating material in the casing there is preferred aluminium oxide, which provides an extremely tight joint with platinum, probably due to the fact that the difference in thermal expansion between platinum and aluminium oxide within the temperature range employed in the manufacture of the electrode is sufficiently small to give this result. For other platinum-group metals other insulating materials, which are inert to water, can give the same tight joints.

The casing has a high density, at least 95% and preferably at least 99% of the theoretical density of the insulating material, and thus a low, preferably closed porosity. This probably contributes to make the casing at least approximately completely resistant to highly pure water. The fact that the casing consists of sintered particles of the insulating material, which preferably has a size of 0.1-10µ so that no possible impurities are enriched in the phase boundary, is probably also a contributing factor. Since the aluminium oxide is sintered, it is of corundum type.

It has been found that the electrode according to the invention can be used as such as a reference electrode when determining the electrochemical potential of a selected construction material in the primary circuit of a boiling water reactor, provided the amount of dissolved hydrogen in the water used during the investigation is at least 50 ppb. If the concentration of dissolved hydrogen has a value of 50 ppb or thereabove, it has been found that platinum has a constant or at least approximately constant electrochemical potential. Such an electrode has a life which is infinite in practice, among other things because it lacks an electrolytic chamber with electrolyte, the composition of which can be successively changed by means of diffusion via the liquid bridge.

Irrespective of the amount of dissolved hydrogen in water, the electrode can also be used as a reference electrode of silver/ silver chloride type. In that case that part of the conductor, which is exposed in the casing, is formed with a protruding part which is coated with silver. Part of the silver layer is coated with silver chloride. Around the protruding part of the conductor there is arranged an electrolytic chamber provided with a liquid bridge, said chamber preferably being of the same material as the casing. The electrode can also be used with an electrolytic chamber for other reference electrodes, such as of mercury-mercuric oxide type and of copper-copper oxide type.

According to a second embodiment of the invention, the electrode is part of a measuring cell for conductivity measurements. The part of the conductor exposed in the casing is then arranged in contact with an electron-conducting layer, which with an intermediate gap is aranged adjacent another electron-conducting layer for measuring the conductivity in an aqueous solution arranged in the gap. The electron-conducting layers suitably consist of a platinum metal, preferably platinum, but they may also consist of other metals which do not yield oxide in hot water, and of graphite.

When the electrode according to the invention is used for supervising corrosion progress in the primary and secondary circuit of a nuclear reactor, it may suitably be arranged in an autoclave which is directly or indirectly connected to the reactor vessel.

In the manufacture of the electrode, a pressure is suitably applied on the insulating material to ensure the formation of a tight joint to the conductor. The manufacture is preferably performed by hot isostatic pressing at a pressure of at least 25 MPa, preferably at least 50 MPa, and at a temperature which is considerably lower than the melting point of the insulating material. For aluminium oxide as well as for zirconium dioxide and stabilized zirconium dioxide, the pressing is carried out suitably at a temperature of 1200°-1500° C. and preferably at a temperature of 1300°-1400° C.

DESCRIPTION OF THE INVENTION

The invention will be explained in greater detail by describing an example with reference to the accompanying drawing, wherein FIG. 1 schematically shows a boiling water reactor with a primary circuit and with a conduit in which an electrode according to the present invention can be arranged for continuously determining the electrochemical potential of one or several construction materials included in the primary circuit, or for continuously determining the conductivity of the reactor water;

FIG. 2 in cross-section an embodiment of the electrode used as a reference electrode;

FIG. 3 the electrode according to FIG. 2 arranged in an autoclave together with an electrode of a construction material in the primary circuit of the reactor;

FIG. 4 in cross-section another embodiment of the electrode used as a reference electrode, and FIG. 5 in cross-section an embodiment of the electrode as part of a measuring cell for continuously determining the conductivity of the reactor water.

DETAILED DESCRIPTION OF THE PREFERRED EMBODIMENTS

Figure 1:
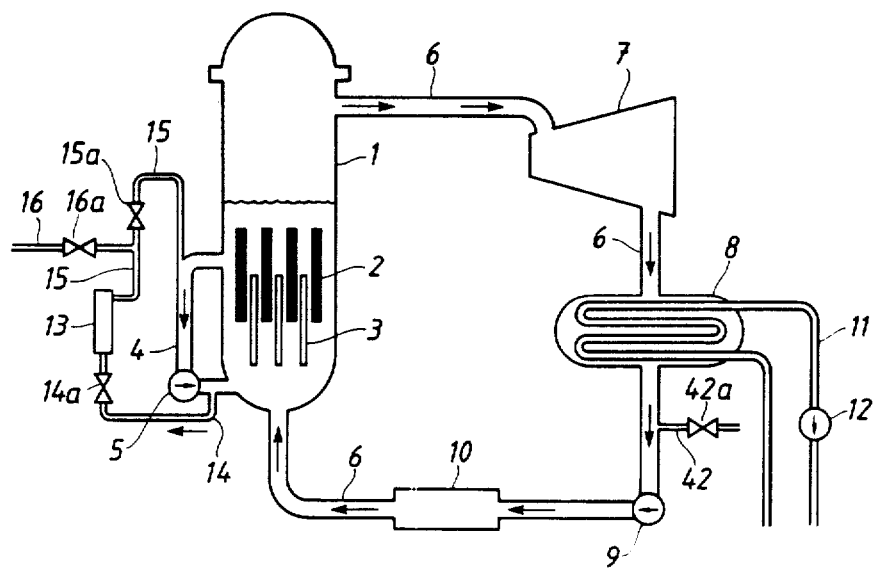

The boiling water reactor shown in FIG. 1 has a reactor vessel 1 with fuel elements 2, control rods 3 and main circulation circuits 4, one of which is shown in the figure. Each main circulation circuit has a pump 5. The main circulation pumps ensure that the reactor core is sufficiently cooled. In addition to the reactor vessel, the primary circuit 6 of the reactor also includes, among other things, a steam turbine 7, a condenser 8, pumps 9 and preheater 10. Steam generated in the reactor core emits its energy to the rotor of the turbine and is condensed, after passage of the turbine, in the condenser with a cooling water circuit 11 including a pump 12. The condensate from the condenser 8 is fed, after preheating in preheater 10, into the reactor vessel by means of pumps 9.

In accordance with the invention, an autoclave 13 (shown greatly enlarged in FIG. 1) of austenitic stainless steel for electrochemical measurements in the reactor water is connected to the main circulating circuit 4 via conduits 14 and 15, that is, is indirectly connected to the reactor vessel. Alternatively, the autoclave may be directly connected to the reactor vessel. The outlet on the autoclave may be connected directly to the reactor vessel or indirectly thereto via the main circulating circuit (via conduit 15) or via another point in the primary circuit, or to a drainage system, or to an outlet; in the latter case via a conduit 16. The conduits 14, 15 and 16 are provided with valves 14a, 15a, and 16a, respectively, which can be opened and closed. A conduit 42 with an openable and a closable valve 42a is further connected to the primary circuit between the condenser 8 and the pump 9. Via the conduit 42 it is possible to supply hydrogen to the reactor water.

The autoclave contains an electrode according to the present invention, possibly together with other equipment, as will be described in greater detail in the following.

Figure 2:
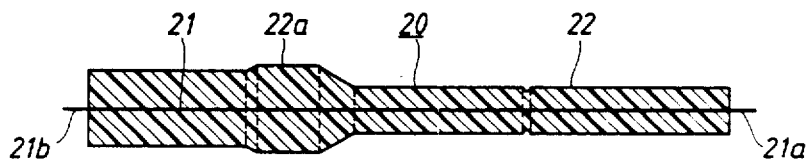

One embodiment of an electrode of the above-mentioned kind is shown in FIG. 2. The electrode 20 has a central wire of platinum 21 with a diameter of 0.5 mm. For the major part of its length, the electrode is enclosed within an electrically-insulating casing 22 making tight contact with the wire, said casing consisting of sintered-together particles of aluminium oxide having a size of 1-2 $\mu$m. The density of the casing is 99.9% of the theoretical density of aluminium oxide. The wire has an exposed part 21a to be arranged in the reactor water and a part 21b to be connected to an electrical measuring means. The casing, which has a diameter of 10 mm nearest the part 21a, is provided with an enlarged part 22a for attachment in the autoclave 13.

The electrode 20 is preferably manufactured by using hot isostatic pressing. In that case, a preformed product is preferably first manufactured, for example by placing the aluminium oxide powder—arranged around the wire 21—in a capsule of plastic, for example softened polyvinyl chloride or rubber. The capsule with the power is subjected to a compaction at, for example 500 MPa at room temperature, a preformed body in the form of a manageable block then being obtained. The block is placed in a sheet metal capsule or a capsule of any other resilient material, which is closed after evacuation. The capsule with its contents is then placed in a high pressure furnace, which is provided with a line through which gas, for example argon, can be supplied for generating the necessary pressure for the isostatic pressing and which, in addition, is provided with heating means. The pressing is suitably carried out a pressure of 100-150 MPa and at a temperature of 1300°-1400° C. for a period of 3 hours. The aluminium oxide then sinters while forming a casing having a density amounting to 99.9% of the theoretical density. When the body has been allowed to cool and the capsule has been removed, the casing is worked into the desired shape by grinding. Provided that the content of hydrogen in the reactor water amounts to at least 50 ppb, the electrode 20 can be used for measuring the electrochemical potential of a material included in the primary circuit, for example stainless steel, in which case it may be arranged in the autoclave 13 with stuffing box sealing in the manner shown in FIG. 3. As mentioned previously, hydrogen may, if necessary, be supplied via the conduct 42 to maintain the content thereof at the necessary value. The electrode 20 is anchored in the autoclave 13 by means of screws 41 via a sealing ring 23 of silver metal, a packing 24 of graphite and a gland 25. The casing 22 with the extended part 22a here functions as a bushing for the conductor 21. The electrode 26, which in the exemplified case is made of stainless steel, is surrounded by an insulator 27 built up of two parts 27a and 27b of aluminium oxide, provided with holes, and of two intermediate parts 27c and 27d of polytetrafluoro ethylene, provided with holes. Between the parts 27c and 27d the electrode is formed with a plate 26a directed perpendicularly to the longitudinal direction of the conductor, and therefore the parts 27a and 27c are fitted onto the conductor from one direction and the parts 27b and 27d are fitted from the other direction. The electrode 26 is anchored in the autoclave in a manner analogous to the electrode 20. In the figure, 28 and 29 designate connections and 30 designates a connection part. The reactor water, which has at least substantially the same pressure and temperature as in the primary circuit, is led in via conduit 14 and led out via conduit 15. Valves 14a and 15a are open during the measurement, whereas valve 16a (FIG. 1) is closed. Because of the stability of the electrode 20, the reactor water can thus be returned to the reactor. The electrochemical potential of the electrode 26 is measured and recorded continuously by the voltmeter 39 for a long time, of the order of several months, while the reactor is in operation. Obvious changes of the potential of the electrode 26 during the continuous monitoring imply that measures have to be taken regarding the operation of the reactor to eliminate the causes of the changes. The voltmeter may be connected—instead of to the electrode 26—to part of the primary system whose electrochemical potential should be followed up. Also, instead of using an electrode 26, the autoclave can be made of the material whose electrochemical potential should be determined and the voltmeter be connected to the autoclave and to the reference electrode.

Figure 4:
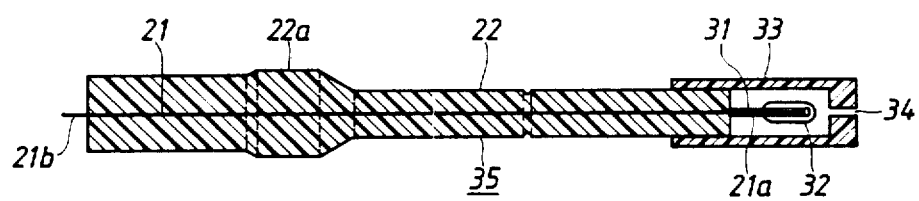

In the embodiment shown in FIG. 4, that part 21a of the conductor 21 of the electrode, which is exposed in the casing, projects out from the casing 22 and is coated, for example by plating, with a layer 31 of silver. Part of the silver layer has a coating 32 of silver chloride. Around the protruding part of the conductor there is arranged an electrolytic chamber 33 of the same material as the casing 22. The electrolytic chamber can be manufactured at the same time as the casing, that is, the casing and the electrolytic chamber can be manufactured in one piece. It can also be manufactured as a separate part and be joined with the casing, suitably by isostatic hot pressing at a temperature necessary for sintering the two parts together. The electrolytic chamber is provided with a liquid bridge 34 in the form of a hole having a diameter of 0.5 mm or in the form of a porous plug of zirconium dioxide having a diameter of 2 mm. When using the electrode, the electrolytic chamber is filled with a solution of silver chloride, formed of water supplied to the electrolytic chamber by partial dissolution of silver chloride. Alternatively, an aqueous solution of potassium chloride may be added to the electrolytic chamber. In use of the electrode, designated 35 in the figure, it can be placed in the autoclave 13 in the same way in which the electrode 20 is placed in the example shown in FIG. 3. The reactor water then flows past the electrode 35 without penetrating through the liquid bridge 34. Because a small diffusion of ions from the electrolytic chamber to the reactor water occurs, the reactor water cannot be returned to the primary circuit but must be discharged to an outlet. The valves 14a and 16a are thus open in this case, whereas the valve 15a is closed. Otherwise, the electrode 35 is used in the same way as the electrode 20.

FIG. 5 shows the use of the electrode according to the invention for conductivity measurement in the reactor water. For parts which correspond to each other, the designations from FIG. 3 have been maintained. The exposed part of the conductor 21a is arranged in contact with an electron-conducting layer 36 consisting of sleeve of platinum having a thickness of 0.3 mm. An electron-conducting layer 37, being concentric with the layer 36 and consisting of a sleeve of platinum having a thickness of 0.3 mm, is arranged on the inside of the autoclave. The space between the layers is designated 38. The layers 36 and 37 are connected to a measurement bridge (40), so that the conductivity of the reactor water can be determined while the reactor is in operation. Valve 14a is then open, and alternatively valve 15a or 16a (FIG. 1) is open, depending on the extent of the risk of contamination of the reactor water during the measurement. As in the case of monitoring while measuring electrochemical potential of construction material, monitoring of the conductivity of the reactor water may give cause to corrections of the operating conditions for the reactor.

We claim:

1. In a nuclear reactor which includes a flow circuit for carrying a high temperature aqueous solution and a means for making electrochemical measurements of the high temperature aqueous solution which flows through said flow circuit, said means including an autoclave and an electrode which is extendable into said autoclave, the improvement wherein said electrode comprises (1) a platinum-group metal conductor which has a first end portion positionable within said autoclave to contact the aqueous solution flowing therethrough, a middle portion and a second end portion positionable outside said autoclave for connection to an electrical measuring means, and (2) an insulating casing which has been isostatically pressed around said middle portion of said conductor to be in tight contact therewith, said casing being composed of sintered-together particles of a material selected from the group consisting of aluminium oxide, zirconium oxide and stabilized zirconium dioxide, said casing having a density of at least 95% of the theoretical density of the material thereof.

2. A nuclear reactor as defined in claim 1, wherein said first end portion of said conductor projects away from said casing, and wherein said electrode also includes an electrolytic chamber projecting away from said casing so as to enclose said first end portion of said conductor, said electrolytic chamber containing an electrolyte therein and having a liquid bridge to enable an electrolytic connection to be created between the electrolyte in said electrolytic chamber and said aqueous solution within the autoclave.

3. A nuclear reactor as defined in claim 2, wherein said electrode includes a silver layer on said first end portion of said conductor and a silver chloride layer on a part of said silver layer.

4. A nuclear reactor as defined in claim 2, wherein said electrolytic chamber is composed of the same material as the material of said casing.

5. A nuclear reactor as defined in claim 1, wherein said autoclave has an inner surface which supports a first electron-conducting layer, wherein siad electrode includes a second electron-conducting layer on said casing which is in contact with said first end portion of said conductor, and wherein a space is provided between said first and second electron-conducting layers.

6. A nuclear reactor as defined in claim 5, wherein said first and second electron-conducting layers consist of a material which includes platinum.

7. A nuclear reactor as defined in claim 1, wherein the density of said casing is at least 99% of the theoretical density of the material thereof.

8. A nuclear reactor as defined in claim 1, wherein said nuclear reactor is a boiling water reactor and said flow circuit is the primary circuit thereof.

9. A nuclear reactor as defined in claim 1, wherein said nuclear reactor is a pressurized water reactor and said flow circuit is the secondary circuit thereof.

10. A nuclear reactor as defined in claim 1, wherein said nuclear reactor includes a main circulation circuit and wherein said autoclave is connected to said main circulation circuit.

* * * * *